US011537472B1

(12) United States Patent
Vaknin et al.

(10) Patent No.: US 11,537,472 B1
(45) Date of Patent: Dec. 27, 2022

(54) STRIPING BASED ON FAILURE DOMAINS RULES

(71) Applicant: VAST DATA LTD., Tel Aviv (IL)

(72) Inventors: Yogev Vaknin, Tel Aviv (IL); Renen Hallak, Tel Aviv (IL); Lior Klipper, Tel Aviv (IL); Eli Malul, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/450,990

(22) Filed: Oct. 14, 2021

(51) Int. Cl.
*G06F 11/10* (2006.01)
*G06F 11/07* (2006.01)
*G06F 3/06* (2006.01)

(52) U.S. Cl.
CPC ........ *G06F 11/1096* (2013.01); *G06F 3/0619* (2013.01); *G06F 3/0659* (2013.01); *G06F 3/0689* (2013.01); *G06F 11/076* (2013.01)

(58) Field of Classification Search
CPC .. G06F 11/1096; G06F 11/076; G06F 3/0619; G06F 3/0659; G06F 3/0689
See application file for complete search history.

(56) References Cited

U.S. PATENT DOCUMENTS

| 11,023,141 | B2 | 6/2021 | Vast Data | |
| 2002/0095532 | A1* | 7/2002 | Surugucchi | G06F 3/0689 710/5 |
| 2010/0306468 | A1* | 12/2010 | Shionoya | G06F 11/1076 711/114 |
| 2022/0308759 | A1* | 9/2022 | Zhao | G06F 3/067 |

* cited by examiner

*Primary Examiner* — Nadeem Iqbal
(74) *Attorney, Agent, or Firm* — Reches Patents (57) ABSTRACT

A method for striping based on evaluated rules, the method may include determining a compatibility, with a storage system utilization policy, of storing stripes under evaluated rules; wherein the evaluated rules define a stripe size, a number of parity chunks per stripe, and maximal numbers of chunks within a stripe per different failure domains of different size ranges; checking whether the storing of the stripes is compatible with the storage system utilization policy; when finding that the storing of the stripes is not compatible then searching for one or more changes of one or more of the maximal numbers that yields compliant one or more maximal numbers that once applied results in a compliance with the storage system utilization policy; applying the compliant one or more maximal numbers when finding the compliant one or more maximal numbers; and determining that the evaluated failure domain rules are non-compliant when failing to find the compliant one or more maximal numbers.

21 Claims, 3 Drawing Sheets

STRIPING BASED ON FAILURE DOMAINS RULES

TECHNICAL FIELD

The present disclosure generally relates to the field of data storage, and more particularly to striping based on failure domains rules.

BACKGROUND

A failure domain is a set of physical components that share a single point of failure. The single point of failure is another physical component that affects the set of physical components when it fails. The set of physical components can be connected to the component that is considered as a single point of failure or included within it.

Erasure code is an error correction scheme used for protecting data against multiple failures in RAID (Redundant Array of Independent Disks) disk arrays, where the data is usually arranged as stripes having k data chunks and r parity chunks, where each chunk is from a different disk.

Reconstruction of data of multiple failed disks is a long process that requires substantial amount of compute and storage resources. A larger number of failed disks within the same stripe results a longer reconstruction process, that consumes more resources.

When using large stripes that involves a large number of disks, the reconstruction process of multiple failed disks is even more complicated, consumes more time, compute resources and storage resources for storing a matrix of long stripes.

In addition, a long stripe may involve multiple disks that belong to the same shared component of a failure domain and therefore being a target to a failure of a single point of failure, that results a failure of the involved multiple disks.

SUMMARY

There may be provide a storage system, a method and a non-transitory computer readable medium for striping based on failure domains rules.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a storage system, a method and a non-transitory computer readable medium that attempt to utilize large stripes, involving a large number of disks in each stripe, while still aiming to reduce participation of more than a limited number of disks in the same stripe that belong to the same failure domains.

It is advantageous to use large stripes, so as to reduce the overhead imposed by the parity chunks of the stripe. It is also advantageous to minimize the number of disks in the same failure domain, particularly when using large stripes that upon disk failure are subject to a complicated reconstruction process, due to the large number of disks in the stripe. A larger number of failed disks complicates the reconstruction even more. However, when using long stripes, it is more difficult to minimize the number of disks in each failure domain, particularly when there are several types of failure domains that need to be taken into account.

The disks (such as hard disks, SSDs (Solid-state drives)) may be affected by failure domains of multiple types, for example: a storage node, a rack that stores multiple storage nodes, a controller (e.g., FPGA) that communicate with a set of disks for managing the low layer operations of SSDs, a carrier or enclosure that houses multiple disks, a slot that is used for attaching more than one disk, and so on.

According to embodiments of the invention, maintaining long stripes is preferred, while minimizing the number of disks from each of multiple failure domains in the stripe, and as long as the number of disks in each of multiple failure domains does not compromise the ability of the system to recover from multiple failures.

The number of disks that belong to various failure domains in one stripe is initially limited to less than the total number of disk failures that the stripe can support without losing data.

Though limiting the number of disks in a failure domain to the maximum supported number of failures will still provide successful recovery from a failure of a failure domain without losing data, it is advantageous to further limit the number of disks in a failure domain even below the number of supported failures, so as to avoid complicated reconstruction of a stripe upon a failure of the failure domain.

For example, suppose the number of parities in a stripe is four, for supporting up to four simultaneous disk failures in the stripe. The number of disks that participate in one stripe and belong to one failure domain may be limited to a portion of the number of supported disk failures, e.g., half of the disks, which results two, in this example. The determination of the limited number of disks in a failure domain is based on both the stripe size and the aiming to keep the reconstruction simpler. For example, if the number of disks in a failure domain would have been chosen to be one disk (instead of two disks), such selection would not allow having large stripes in smaller storage systems, with less options to select disks from different failure domains for one stripe.

Therefore, as an initial rule of failure domain limitation, the number of disks in each type of failure domain, of multiple types of failure domains of the storage system, is limited to a portion of the maximum number of supported disk failures.

The failure domains are of various types of physical grouping of disks, where different types of failure domains may influent different number of disks—or different range numbers of disks. A range number may be a single number or may include multiple numbers.

In the following examples, the storage system includes multiple racks, each includes multiple storage nodes (or storage boxes), each storage node includes multiple disks that are grouped and housed in multiple disk carriers, and each smaller set of disks is controlled by a controller (e.g., FPGA). Therefore, the storage system includes the following types of failure domains, according to their influence on the number of affected disks: a rack, a storage box, a disk carrier, and a controller. The rack influences the largest number of disks among all the failure domain types, and the controller influences the smallest number of disks among all the failure domain types.

According to the initial failure domain limitation, the limited number of disks in each of the four types of failure domains is set to a portion of the maximum supported failed disks in a stripe. Suppose the limited number of disks in a failure domain is set to two out of four supported concurrent failures in a stripe, then a stripe can include up to two disks controlled by a single controller, up to two disks from a single carrier, up to two disks from a single storage node, and up to two disks from a single rack. Though in this example the initial portion of the maximum supported failed disks (or the limited number of disks in a failure domain) was selected as the same number (two) to all failure domains, this is not necessarily so, and different limited number of disks may be chosen for different types of failure domains.

Stripe allocation is determined when data needs to be striped and written to the storage system. The stripe allocation determines which disks participate in the stripe according to the current failure domain limitation. If it is determined that the current failure domain limitation cannot be conformed to, when using the desired stripe size, the failure domain limitation is updated to ease the limitation on the broadest failure domain, i.e., the failure domain that influences the largest number of disks, in this example, the rack, such that the stripe may have a larger number of disks from the same rack. Therefore, the limit on the number of disks from a single rack is increased to three, while the rest of the failure domains are still limited to two disks in one stripe.

If the assignment of disks to a stripe still cannot comply to the updated limit, then the same failure domain limitation, of the rack, is further increased to 4. The process repeats until the limit on this failure domain reaches the maximum number of supported failed disks.

When the limit on the rack reaches the maximum number of supported failed disks, and still the assignment of disks to the stripe cannot conform to the limitation rule, the next (second broadest) failure domain, for which limitation is to be alleviate, is selected, according to the order of number of influenced disks. In this example, the storage node is selected. The limitation on the storage node is increased to three, and if still cannot be conformed to, the limitation is increased to four, and then continuing to change the limitation on the next failure domains according to the order of number of influenced disks. Only if the highest alleviate limits for all the failure domains is reached and still the most alleviate rule cannot be conformed to, then the stripe size is shortened to comply with the failure domain limitation.

The current failure domain rule for defining the number of disks in each failure domain is based on the current configuration of the storage system and the current state of free space in the various disks. The failure domain rule may be determined: (i) upon each configuration change, for example adding racks, storage nodes, disks, etc.; (ii) upon creating a stripe; (iii) before creating a group of stripes; (iv) When there is a certain amount of change in the free space of the disks; (v) periodically, e.g., every few minutes, or—according to the pace of creating new stripes in the system.

Figure 1:
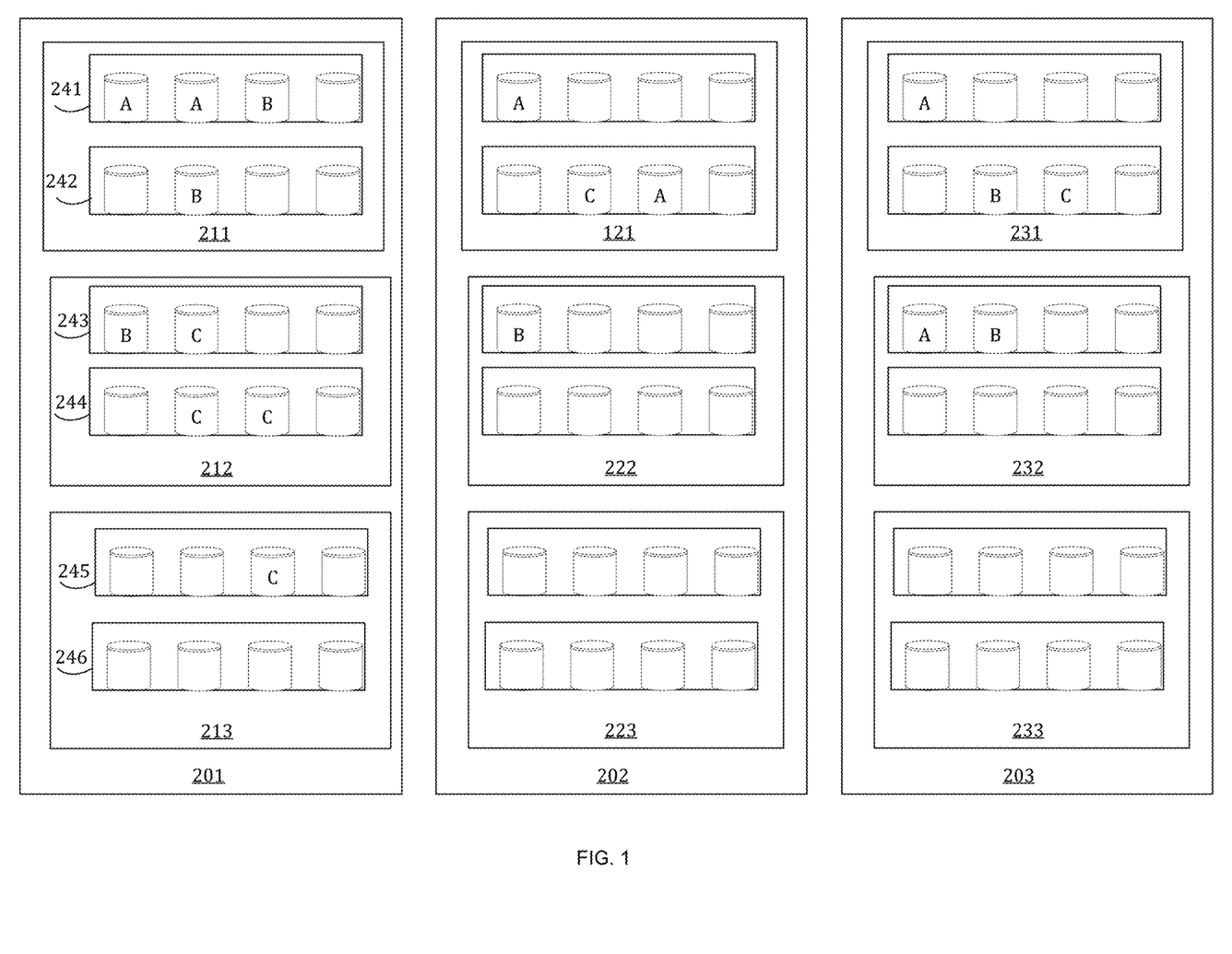
FIG. 1 illustrates an example of a stripe.

FIG. 1 illustrates storage domains of a storage system and the arrangement of different stripes across various failure domains using various adaptations of the failure domain rule. Three racks 201, 202, 203 are illustrated, which are the broadest failure domains. Each rack is illustrates as including three storage nodes, such as storage nodes 211-213 of rack 201, storage nodes 221-223 of rack 202, and storage nodes 231-233 of rack 203. Each storage node is illustrated as including two enclosures, such enclosures 241 and 242 of storage node 211, enclosures 243 and 244 of storage node 212, enclosures 245 and 246 of storage node 213.

Configuration of three stripes is illustrated. The letters A, B and C indicate the disks that stores chunks of the three stripes A, B and C.

Stripe A was created when the failure domain rule allowed conforming to up to two disks in a stripe from each failure domain. Accordingly, stripe A involves only two disks in each rack: two disks in rack 201, two disks in rack 202, and two disks in rack 203. Stripe A involves no more than two disks in each storage node: two disks in storage node 211, two disks in storage node 221, and one disk in each of storage nodes 231 and 232.

Stripe B was created when the state of available disks did not allow sticking to the initial failure domain rule, and therefore stripe B includes three chunks in disks of rack 201, while the rest of the initial rule, dictating no more than two disks in one failure domain, is maintained.

Stripe C was created when the state of available disks did not allow using the strictest limitation of the number of disks in the next broadest failure domain, e.g., storage nodes. Therefore, stripe C includes four chunks in disks of rack 201 (the maximum allowed according to the maximum supported failed disks), and three chunks in disks of storage node 212. The rest of the rule is kept and there are no more than two disks in one enclosure.

It should be noted that there may be restrictions on a number of chunks of the same storage node of the rack and/or there may be a limitation on the number of chunks of a stripe per enclosure of the storage node. For example—there may be allowed up to one disk per enclosure.

The racks, the storage nodes and the enclosure may be regarded as three failure domain types of three size ranges. Each may be associated with a maximal number of chunks per stripe, where the maximal number of chunks per stripe in a failure domain of a certain size range is the determined maximal number in a current striping rule, and is a portion of the maximum number of supported concurrent disk failures (or the number of parity chunks in a stripe) and can be updated to no more than the number of parity chunks in a stripe.

There may be provided a method for striping based on evaluated rules. The evaluated rules may include evaluated striping rules that may define stripe size and/or number of parity chunks. The evaluated rules may also include failure domain rules which limit the distribution of chunks of a same stripe.

The method attempts to check whether stripes of a certain size and certain number of parity chunks may be used in a storage system in view of a storage system utilization policy and in view of one more striping rule such as define the maximal number of chunks of a stripe per failure domains.

The method may be executed once or multiple times, and the outcome of an execution of a method may be based, at least in part, on a current status of the storage system. Thus—from time to time the outcomes of the execution of the method may change—thus defining stripes of different parameters—for example—different stripe sizes and/or of different number of parity chunks per stripe.

An execution of the method may include multiple iterations—whereas each iteration may check one or more different maximal numbers of chunks within a stripe per different failure domains of different size ranges.

Figure 2:
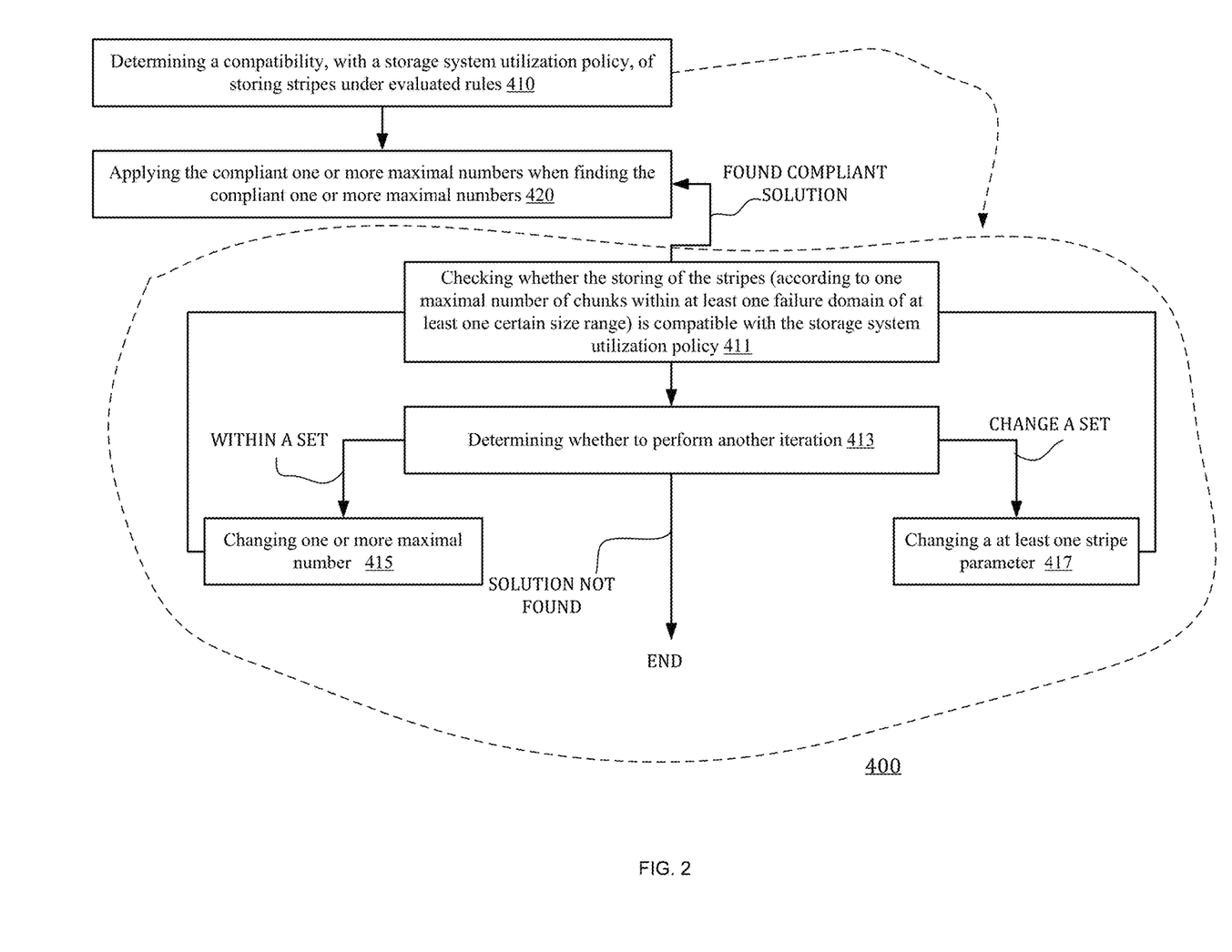
FIG. 2 illustrates an example of a method.

FIG. 2 illustrates method 400.

Method 400 may include step 410 of determining a compatibility of storing stripes under evaluated rules with a storage system utilization policy.

The evaluated rules may define a stripe size, a number of parity chunks per stripe, and maximal numbers of chunks within a stripe per different failure domains of different size ranges. The size range may be related to the number of storage devices that are influenced by a failure of the failure domain of the corresponding size range.

The storage system utilization policy refers to various factors related to the storage state that should to be considered when building stripes, and whether one or more stripes can be built in view of these storage state factors and the rules related to the failure domains.

For example:
  a. The ability to use the current striping rules during a following time window of a certain length (e.g., the next 5 minutes, the next few hours, the next few weeks, and the like).
  b. The overall utilization of the storage space or any part of the storage space of the storage system. The part may be one or more failure domains, or any other part of the storage system.
  c. The ability to use the current striping rules for a certain amount of data that is expected to be striped in the following time window, while taking into account the pace of writing data into the system.
  d. The policy may consider at least one of a total amount of free storage space, a number of storage devices, a number of non-operational devices, a number of operational devices in each failure domain, a number of failure domains, and an amount of pending data waiting to be striped and permanently stored, etc.

The policy may be revised periodically or upon certain events, e.g., a change in the amount of free storage space that exceed a certain threshold, a certain amount of pending data that is waiting to be striped has exceeded a certain threshold, etc.

Storing stripes under the evaluated rules may be compatible with the storage system utilization policy, when it is assumed that stripes that conform to the evaluated rules can be created at least for a certain amount of data that is pending to be striped, or that is expected to enter the system within a certain time window from the present, where the ability to create such stripes is based, for example, on storage state factors such as: the amount of free space, the number of failure domains of each size range, the number of operational disks in each failure domain, and the like.

Storing stripes under the evaluated rules may be incompatible with the storage system utilization policy, when it is assumed that stripes that follow the striping rules cannot be created when taking into account the above factors.

Step 410 may include executing multiple sets of evaluation iterations. In each set the stripe size and the number of parity chunks per stripe remain the same. Different iterations of the set may differ from each other by at least one maximal number of chunks within at least one failure domain of at least one certain size range.

For example, the first iteration may set the maximal number of chunks within each failure domain to a certain portion (e.g., half) of the number of parity chunks.

The next iterations increase the maximal number of chunks of at least one failure domain, and as long as the maximal number of chunks does not exceed the number of parity chunks.

The next iterations increase a maximal number of chunks of failure domains may prefer increasing the maximal number of chunks of failure domains of broader size ranges (that influence more disks) before needing to increase the maximal number of chunks of failure domains of narrower size ranges.

Different sets of iterations differ from each other by at least one stripe parameter out of the stripe size and the number of parity chunks per stripe.

For example, in a case where the maximal number of chunks of failure domains of all size ranges has reached the number of parity chunks, then the size of the stripe is decreased (the number of data chunks of the stripe is decreased) and the new set of iterations check again the maximal number of chunks of failure domains when using the new stripe size.

Executing an iteration of a set of iterations may include checking (in step 411) whether the storing of the stripes (according to one maximal number of chunks within at least one failure domain of at least one certain size range) is compatible with the storage system utilization policy.

If finding compliancy then step 411 may be followed by step 420. It should be noted that finding the compliancy may be followed by providing an indication that compliancy was found.

When finding that the storing of the stripes is not compatible then step 411 is followed by step 413 of determining whether to perform another iteration of a set.

If determining to perform another iteration within the set—step 413 is followed by step 415 of changing one or more maximal number of chunks within at least one failure domain of at least one certain size range—and jumping to step 411.

If determining to perform a new iteration within a new set—step 413 is followed by step 417 of changing at least one stripe parameter and jumping to step 411.

If no compliant solution was found and the search of all sets was exhausted then the method end.

Multiple repetitions of steps 411, 413, 415 and 417 may amount to searching for one or more changes of one or more of the maximal numbers that yields compliant one or more maximal numbers that once applied results in a compliance with the storage system utilization policy.

Step 410 may be followed by step 420 of applying the compliant of one or more maximal numbers when finding the compliant one or more maximal numbers. A compliance with the storage system utilization policy means that stripes can be built according to the defined rules. Applying the compliant one or more maximal numbers, may include building one or more stripes, with of the defined stripe length (number of data chunks and/or parity chunks), that conforms to the defined maximal numbers in each of the different size ranges of failure domains.

Within a set, the values of the maximal numbers may be changed in any order or manner. For example—the maximal number related to failure domains of different size ranges may start from checking the maximal numbers of the largest failure domain and then may check the maximal numbers of other failure domains—according to their size—and in a descending order.

One or more iterations may be executed per different values of the maximal number of the same class of failure domains.

One, some or all of the evaluated maximal numbers may be (at least initially—during first iterations of a set) a fraction of the number of parity chunks. The fraction is smaller than one—if there are P parity chunks, then the fraction may range between $1/P$ till $(P-1)/P$. P is a positive integer.

The maximal numbers may reach the parity value P.

Lets assume that the method evaluated a stripe that has one hundred and fifty chunks (S(#))—including six parity chunks (Par(#)).

Initially the maximal number of chunks per stripe per rack (Cps(r)Max) is three, the maximal number of chunks per stripe per storage node (Cps(n)Max) is two and the maximal number of chunks per stripe per enclosure (Cps(e)Max) is one.

The following example assume a certain order of changes of evaluated rules—but other orders may be applied. For example—the iterations may not include sets whereas in each set the stripe parameter may remain the same. Yet for another example—different iterations may start by increasing (Cps(r)Max) while maintaining (Cps(n)Max) and (Cps(e)Max) the same.

A first set of iterations may start and may evaluate whether stripes can be stored in compliance with a storage system utilization policy assuming that S(#)=150, Par(#)=4, Cps(r)Max=3, Cps(n)Max=2 and Cps(e)Max=1.

If a compliance is obtained then the method ends.

If no compliance is obtained then Cps(r) may be increased to Cps(r)Max=4. Cps(n)Max may remain 2 and Cps(e)Max may remain 1.

If a compliance is obtained then the method ends.

If no compliance is obtained then Cps(r) may be increased to Cps(r)Max=5. Cps(n)Max may remain 2 and Cps(e)Max may remain 1.

Assuming that not compliance is found even when Cps(r)Max=6 then the value of Cps(n)Max may be incremented during the next one or more iterations.

Assuming that not compliance is found even when Cps(r)Max=6 and Cps(n)Max=6 then the value of Cps(e)Max may be incremented during the next one or more iterations.

If no compliance is obtained even when Cps(r)Max=6, Cps(n)Max=6 and Cps(e)Max=6 then the set is exhausted—and a next set may start—in which one or more of the stripe parameters may be decreased.

Figure 3:
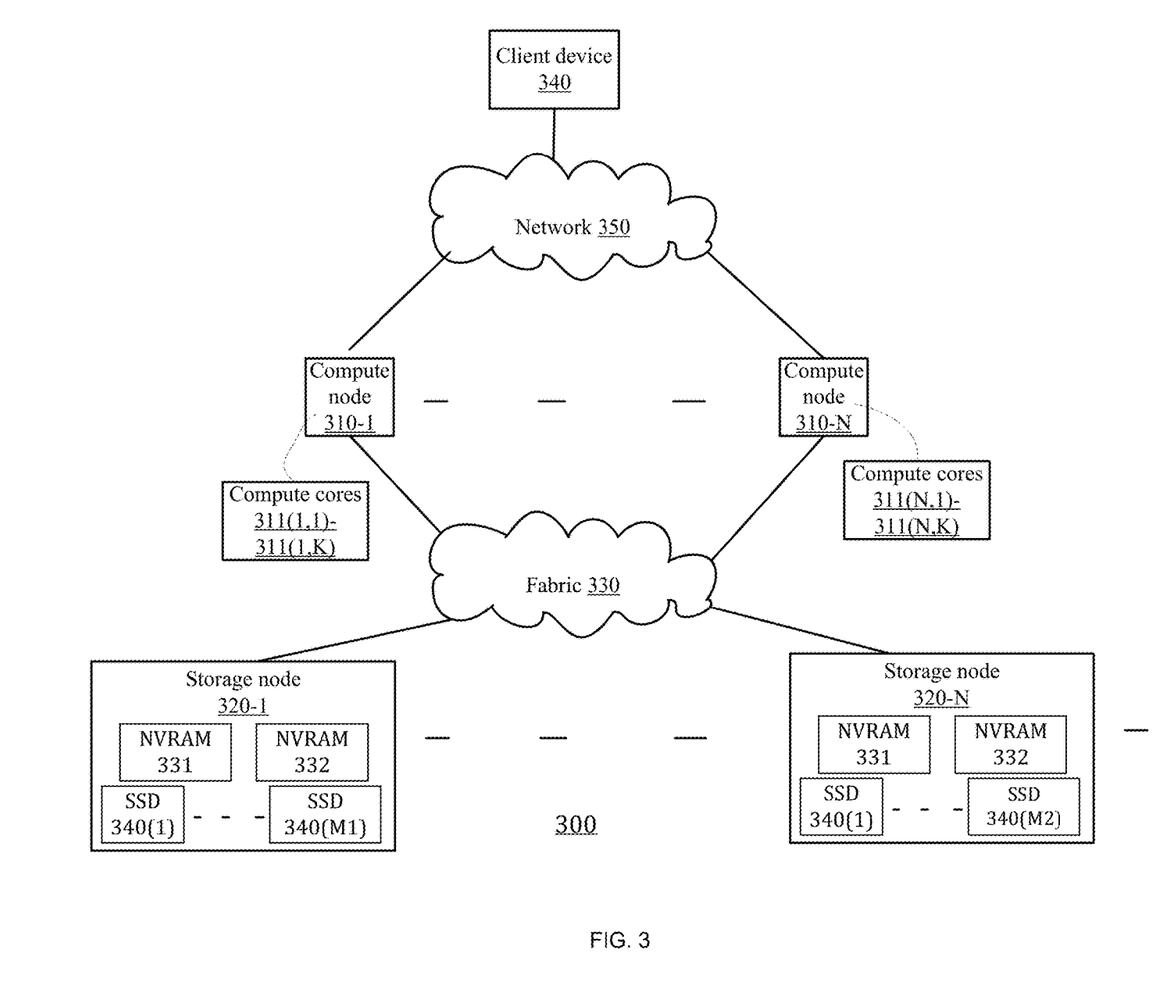
FIG. 3 is an example of a storage system.

FIG. 3 shows an example diagram of a storage system 300 according to the disclosed embodiments.

The storage system 300 includes a number of N compute nodes 310-1 through 310-N (hereinafter referred to individually as a compute node 310 and collectively as compute nodes 310, merely for simplicity purposes, N is an integer equal to or greater than 1). The compute nodes include (or may execute) multiple compute cores each—see for example compute cores 311(1,1)-311(1,K) and compute cores 311(N,1)-311(N,K).

The storage system 100 also includes a number of M storage nodes storage node 320-1 through 320-M (hereinafter referred to individually as a storage node 320 and collectively as storage nodes 320, merely for simplicity purposes, M is an integer equal to or greater than 1). The storage nodes may be housed in storage boxes (not shown) and the storage boxes may be housed in racks (not shown). The computer nodes 310 and the storage nodes 320 are connected through a communication fabric 330. M may equal N or may differ from N.

In an embodiment, a compute node 310 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 310 does not require any dedicated hardware A compute node 310 is configured to perform tasks related to the management of the storage nodes 320. In an embodiment, each compute node 310 interfaces with multiple client devices such as a client device 340 (or an application installed therein) via a network 350. To this end, a compute node 310 is configured to receive requests (e.g., read or write requests) and promptly serve these requests in a persistent manner. The network 350 may be, but is not limited to, the Internet, the world-wide-web (WWW), a local area network (LAN), a wide area network (WAN), and the like.

In an embodiment, a compute node 310 is configured to interface with different protocols implemented by the client devices or applications (e.g., TCP/IP, HTTP, FTP, various filesystem protocols, etc.) and to manage the read and write operations to the storage nodes 320. The compute node 310 is further configured to translate the protocol commands into a unified structure (or language). Then, each compute node 310 is also configured to logically address and map all elements stored in the storage nodes 320.

Further, each compute node 310 may participate in stripe building according to the striping rules and the storage policy. One or more compute node may evaluate the striping rules and may execute method 400.

In an embodiment, to efficiently read and write data to the storage nodes 320 from the physical layer, each compute node 310 performs a number of processes including data reduction, data resiliency, and Flash memory management actions (e.g., defrag, wear leveling, and so on).

It should be noted that each compute node 310 may operate in the same manner as all other compute nodes 310. In a case of a failure, any compute node 310 can replace the failed node. Further, each compute node may control and manage one or mode storage nodes 320 regardless of the specific architecture of the storage nodes 320. Therefore, there is no coupling between specific compute nodes 310 and specific storage nodes 320. As such, compute nodes can be added to the system 300 without increasing the number of storage nodes (or their capacity), and vice versa, storage nodes can be added without increasing the number of compute nodes 310.

The storage nodes 320 provide the storage and state in the system 300. To this end, each storage node 320 may include a plurality of SSDs, such as SSDs 340, for example storage node 320-1 includes M1 SSDs 340(1)-340(M1). Each storage node further includes fast accessed memory for storing the traversal task queues, such as NVRAM 331 and 332 of FIG. 3.

The storage nodes 320 may be configured to have the same capacity as each other or different capacities from each other. In an embodiment, the data stored in each storage node 320 is made redundant internally within the storage node, made redundant at a different storage node, or both.

A storage node 320 may be configured to communicate with the compute nodes 310 over the communication fabric 330. It should be noted that each compute node 310 can communicate with each storage node 320 over the communication fabric 330. There may not be a direct coupling between a compute node 310 and storage node 320.

In the embodiment, the communication fabric 330 may include an Ethernet fabric, an InfiniBand fabric, and the like. Specifically, the communication fabric 330 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 340 is part of a compute node 310. In such a deployment, the system 300 does not communicate with an external network, e.g., the network 350. It should be further noted that the communication between the compute nodes 310 and the storage nodes 320 is facilitated over the fabric 330. It should be further noted that the compute nodes 320 can communicate with each other over the fabric 330. The fabric 330 is a shared fabric.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for striping based on evaluated rules, the method comprises:
    determining a compatibility, with a storage system utilization policy, of storing stripes under evaluated rules;
        wherein the evaluated rules define a stripe size, a number of parity chunks per stripe, and maximal numbers of chunks within a stripe per different failure domains of different size ranges;
    checking whether the storing of the stripes is compatible with the storage system utilization policy;
    when finding that the storing of the stripes is not compatible then searching for one or more changes of one or more of the maximal numbers that yields compliant one or more maximal numbers that once applied results in a compliance with the storage system utilization policy;
    applying the compliant one or more maximal numbers when finding the compliant one or more maximal numbers; and
    determining that the evaluated failure domain rules are non-compliant when failing to find the compliant one or more maximal numbers.

2. The method according to claim 1 wherein each of the evaluated maximal numbers is a fraction of the number of parity chunks.

3. The method according to claim 1 wherein initially, each of the evaluated maximal numbers is a fraction of the number of parity chunks.

4. The method according to claim 1, wherein the searching for one or more changes of one or more of the evaluated maximal numbers comprises multiple search iterations.

5. The method according to claim 4, wherein one search iteration comprises searching for one or more changes of a maximal number of one or more failure domains of a first size range and another search iteration comprises searching for one or more changes of a maximal number of one or more failure domains of a second size range that differs from the first size range.

6. The method according to claim 5, wherein the search iteration precedes the other search iteration and wherein a maximal size value of the second size range is smaller than a maximal size value of first size range.

7. The method according to claim 4, wherein the multiple search iterations start by searching, during a first search iteration, for one or more changes of a maximal number of one or more failure domains of a size range that has a maximal size value of all the size ranges.

8. The method according to claim 4, wherein the multiple search iterations scan, while failing to comply, failure domains in descending order starting from one or more failure domains of a size range that has a maximal size value of all the size ranges.

9. The method according to claim 4 wherein the multiple search iterations comprise performing a plurality of search iteration per size range, while for at least one size range the plurality of iteration comprises increasing the maximal numbers till reaching the number of parity chunks.

10. The method according to claim 1 comprising changing at least one of a stripe size and a number of parity chunks per stripe when failing to find a compliance despite exhausting changes in maximal numbers of chunks values while maintaining the stripe size and the number of parity chunks per stripe.

11. A non-transitory computer readable medium for striping based on evaluated rules, the non-transitory computer readable medium stores instructions for:
    determining a compatibility, with a storage system utilization policy, of storing stripes under evaluated rules;
        wherein the evaluated rules define a stripe size, a number of parity chunks per stripe, and maximal numbers of chunks within a stripe per different failure domains of different size ranges;
    wherein the determining of the compatibility comprises:
        checking whether the storing of the stripes is compatible with the storage system utilization policy;
        when finding that the storing of the stripes is not compatible then searching for one or more changes of one or more of the maximal numbers that yields compliant one or more maximal numbers that once applied results in a compliance with the storage system utilization policy;
        applying the compliant one or more maximal numbers when finding the compliant one or more maximal numbers; and
        determining that the evaluated failure domain rules are non-compliant when failing to find the compliant one or more maximal numbers.

12. The non-transitory computer readable medium according to claim 11 wherein each of the evaluated maximal numbers is a fraction of the number of parity chunks.

13. The non-transitory computer readable medium according to claim 11 wherein initially, each of the evaluated maximal numbers is a fraction of the number of parity chunks.

14. The non-transitory computer readable medium according to claim 11, wherein the searching for one or more changes of one or more of the evaluated maximal numbers comprises multiple search iterations.

15. The non-transitory computer readable medium according to claim 14, wherein one search iteration comprises searching for one or more changes of a maximal number of one or more failure domains of a first size range and another search iteration comprises searching for one or more changes of a maximal number of one or more failure domains of a second size range that differs from the first size range.

16. The non-transitory computer readable medium according to claim 15, wherein the search iteration precedes the other search iteration and wherein a maximal size value of the second size range is smaller than a maximal size value of first size range.

17. The non-transitory computer readable medium according to claim 14, wherein the multiple search iterations start by searching, during a first search iteration, for one or more changes of a maximal number of one or more failure domains of a size range that has a maximal size value of all the size ranges.

18. The non-transitory computer readable medium according to claim 14, wherein the multiple search iterations scan, while failing to comply, failure domains in descending order starting from one or more failure domains of a size range that has a maximal size value of all the size ranges.

19. The non-transitory computer readable medium according to claim 14 wherein the multiple search iterations comprise performing a plurality of search iteration per size range, while for at least one size range the plurality of iteration comprises increasing the maximal numbers till reaching the number of parity chunks.

20. The non-transitory computer readable medium according to claim 11 wherein the non-transitory computer readable medium stores instructions for changing at least one of a stripe size and a number of parity chunks per stripe when failing to find a compliance despite exhausting changes in maximal numbers of chunks values while maintaining the stripe size and the number of parity chunks per stripe.

21. A storage system that comprises at least one controller that is configured to:
   determine a compatibility, with a storage system utilization policy, of storing stripes under evaluated rules; wherein the evaluated rules define a stripe size, a number of parity chunks per stripe, and maximal numbers of chunks within a stripe per different failure domains of different size ranges;
   wherein the determining of the compatibility comprises:
      checking whether the storing of the stripes is compatible with the storage system utilization policy;
      when finding that the storing of the stripes is not compatible then searching for one or more changes of one or more of the maximal numbers that yields compliant one or more maximal numbers that once applied results in a compliance with the storage system utilization policy;
   applying the compliant one or more maximal numbers when finding the compliant one or more maximal numbers; and
   determining that the evaluated failure domain rules are non-compliant when failing to find the compliant one or more maximal numbers.

* * * * *